(12) United States Patent
Kang et al.

(10) Patent No.: US 9,548,475 B2
(45) Date of Patent: Jan. 17, 2017

(54) BATTERY CELL OF IRREGULAR STRUCTURE AND BATTERY MODULE EMPLOYED WITH THE SAME

(71) Applicant: LG CHEM, LTD., Seoul (KR)

(72) Inventors: Kyoung Won Kang, Daejeon (KR); Hyun Chul Jung, Daejeon (KR); Ki Woong Kim, Daejeon (KR); Sungjin Kwon, Daejeon (KR)

(73) Assignee: LG CHEM, LTD., Seoul (KR)

(*) Notice: Subject to any disclaimer, the term of this patent is extended or adjusted under 35 U.S.C. 154(b) by 5 days.

(21) Appl. No.: 14/515,848

(22) Filed: Oct. 16, 2014

(65) Prior Publication Data
US 2015/0037664 A1    Feb. 5, 2015

Related U.S. Application Data

(63) Continuation of application No. PCT/KR2013/003930, filed on May 7, 2013.

(30) Foreign Application Priority Data

May 7, 2012  (KR) .................. 10-2012-0047854

(51) Int. Cl.
H01M 2/02    (2006.01)
H01M 2/26    (2006.01)
(Continued)

(52) U.S. Cl.
CPC .............. *H01M 2/02* (2013.01); *H01M 2/021* (2013.01); *H01M 2/024* (2013.01);
(Continued)

(58) Field of Classification Search
CPC ............................................. H01M 2002/0205
See application file for complete search history.

(56) References Cited

U.S. PATENT DOCUMENTS 6,040,078 A * 3/2000 Fauteux .............. H01M 4/0442
429/163
7,803,483 B2 * 9/2010 Takami ................. H01M 2/021
320/134
(Continued)

FOREIGN PATENT DOCUMENTS

CN   101529613 A   9/2009
CN   101777666 A   7/2010
(Continued)

OTHER PUBLICATIONS

International Search Report issued in PCT/KR2013/003930, mailed on Sep. 16, 2013.
(Continued)

*Primary Examiner* — Gregg Cantelmo
(74) *Attorney, Agent, or Firm* — Birch, Stewart, Kolasch & Birch, LLP

(57) ABSTRACT

Disclosed herein is a battery cell configured to have a structure in which an electrode assembly that can be charged and discharged is mounted in a plate-shaped battery case, a cathode terminal and an anode terminal protrude from one end of the battery case, the electrode terminals deviate to one side from a vertical central axis of a battery body when viewed from above, and a depressed portion is formed at one side of the battery body.

16 Claims, 6 Drawing Sheets

(51) Int. Cl.
*H01M 2/30* (2006.01)
*H01M 10/0525* (2010.01)

(52) U.S. Cl.
CPC ....... *H01M 2/0217* (2013.01); *H01M 2/0287* (2013.01); *H01M 2/26* (2013.01); *H01M 2/30* (2013.01); *H01M 2/0285* (2013.01); *H01M 10/0525* (2013.01); *H01M 2002/0205* (2013.01); *H01M 2220/20* (2013.01); *H01M 2220/30* (2013.01); *Y02T 10/7011* (2013.01)

(56) References Cited

U.S. PATENT DOCUMENTS

| | | | |
|---|---|---|---|
| 2010/0047685 A1* | 2/2010 | Lee | H01M 2/021 429/176 |
| 2010/0173193 A1 | 7/2010 | Kim | |
| 2011/0076533 A1 | 3/2011 | Choi | |
| 2011/0274955 A1* | 11/2011 | Park | H01M 2/0212 429/94 |
| 2012/0015223 A1 | 1/2012 | Bhardwaj et al. | |
| 2012/0015236 A1 | 1/2012 | Spare | |
| 2014/0113184 A1* | 4/2014 | Hamel | H01M 10/0436 429/179 |

FOREIGN PATENT DOCUMENTS

| | | |
|---|---|---|
| CN | 102332599 A | 1/2012 |
| CN | 102340021 A | 2/2012 |
| JP | 2000-133317 A | 5/2000 |
| JP | 2005-038613 A | 2/2005 |
| KR | 10-2003-0066960 A | 8/2003 |
| KR | 10-2010-0109842 A | 10/2010 |
| KR | 10-2011-0034313 A | 4/2011 |
| KR | 10-2011-0082892 A | 7/2011 |
| KR | 10-2011-0105737 A | 9/2011 |
| WO | WO 2011/115464 A2 | 9/2011 |

OTHER PUBLICATIONS

Extended European Search Report, dated Nov. 18, 2015, for European Application No. 13787997.9.

* cited by examiner

BATTERY CELL OF IRREGULAR STRUCTURE AND BATTERY MODULE EMPLOYED WITH THE SAME

CROSS REFERENCE TO RELATED APPLICATIONS

This application is a Continuation of PCT International Application No. PCT/KR2013/003930, filed on May 7, 2013, which claims priority under 35 U.S.C. 119(a) to Patent Application No. 10-2012-0047854, filed in the Republic of Korea on May 7, 2012, all of which are hereby expressly incorporated by reference into the present application.

TECHNICAL FIELD

The present invention relates to a battery cell of a novel structure and a battery pack including the same and, more particularly, to a battery cell configured to have a structure in which an electrode assembly that can be charged and discharged is mounted in a plate-shaped battery case, a cathode terminal and an anode terminal protrude from one end of the battery case, the electrode terminals deviate to one side from a vertical central axis of a battery body when viewed from above, and a depressed portion is formed at one side of the battery body.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be classified as a cylindrical battery, a prismatic battery, or a pouch-shaped battery. Based on the type of an electrolyte, a lithium secondary battery may be also classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte in a pouch-shaped battery case, made of a laminate sheet including a resin layer and a metal layer, in a sealed state. The electrode assembly mounted in the battery case is configured in a jelly-roll (wound) type structure, a stacked type structure, or a combination (stacked/folded) type structure.

FIG. 1 is a view typically showing the structure of a pouch-shaped secondary battery including a stacked type electrode assembly. Referring to FIG. 1, a pouch-shaped secondary battery 10 is configured to have a structure in which an electrode assembly 30, including cathodes, anodes, and separators disposed respectively between the cathodes and the anodes, is mounted in a pouch-shaped battery case 20 in a sealed state such that two electrode leads 40 and 41 electrically connected to cathode and anode tabs 31 and 32 of the electrode assembly 30 are exposed to the outside.

The battery case 20 includes a case body 21 having a depressed receiving part 23, in which the electrode assembly 30 is located, and a cover 22 integrally connected to the case body 21.

The battery case 20 is made of a laminate sheet including an outer resin layer 20A constituting the outermost portion of the laminate sheet, an isolation metal layer 20B preventing penetration of materials, and an inner resin layer 20C for sealing.

The cathode tabs 31 and the anode tabs 32 of the stacked type electrode assembly 30 are respectively coupled to the electrode leads 40 and 41 by welding. In addition, insulative films 50 are attached to the top and bottom of each of the electrode leads 40 and 41 to prevent the occurrence of a short circuit between a thermal welding device (not shown) and the electrode leads 40 and 41 and to secure sealing between the electrode leads 40 and 41 and the battery case 20 when the upper end 24 of the case body 21 and the upper end of the cover 22 are thermally welded to each other using the thermal welding device.

In recent years, however, a new type of battery cell is required in accordance with a trend change for a slim type design or various other designs.

In addition, the above-mentioned battery cells are configured to have the same size or the same capacity to constitute a battery pack. For this reason, in order to manufacture a lightweight and thin battery pack in consideration of the design of a device, to which the battery pack is applied, it is necessary to reduce the capacity of the battery pack or modify the design of the device such that the size of the device is increased. Furthermore, electrical connection is complicated during modification of the design of the device with the result that it is difficult to manufacture a battery pack satisfying desired conditions.

Therefore, there is a high necessity for a battery cell that can be used depending upon the shape of a device, to which a battery pack is applied, while maintaining the capacity of the battery pack, and a battery pack including the same.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have developed a battery cell configured to have a novel structure in which an electrode assembly that can be charged and discharged is mounted in a plate-shaped battery case, a cathode terminal and an anode terminal protrude from one end of the battery case such that the electrode terminals deviate to one side, and a depressed portion is formed at one side of the battery body, based on which battery cells having various capacities and sizes can be manufactured.

Therefore, it is an object of the present invention to provide a battery module including the above battery cells, which is mounted in various spaces of a device to which the battery module is applied, whereby it is possible to maximally utilize an internal space of the device, the battery module may be mounted even in a space in which it is difficult to mount a conventional battery module as well as a narrow and small space, and it is possible to provide a battery cell having a novel structure based on which it is possible to design various types of battery modules and a battery module including the same.

Technical Solution

In accordance with one aspect of the present invention, the above and other objects can be accomplished by the provision of a battery cell configured to have a structure in which an electrode assembly that can be charged and discharged is mounted in a plate-shaped battery case, a cathode terminal and an anode terminal protrude from one end of the battery case, the electrode terminals deviate to one side from a vertical central axis of a battery body when viewed from above, and a depressed portion is formed at one side of the battery body.

The battery cell according to the present invention is based on the specific structure as described above. Consequently, it is possible to manufacture battery cells having various capacities and sizes based on the battery cell according to the present invention. In addition, a battery module including the battery cell according to the present invention may be mounted in various spaces of a device to which the battery module is applied. Consequently, it is possible to maximally utilize an internal space of the device. Furthermore, the battery module according to the present invention may be mounted even in a space in which it is difficult to mount a conventional battery module as well as a narrow and small space. Consequently, it is possible to design various types of battery modules.

In a preferred example, the battery cell may be a lithium ion battery or a lithium ion polymer battery. However, the present invention is not limited thereto.

In addition, the battery cell may be a thin battery generally having a small thickness. For example, the battery cell may be a prismatic battery or a pouch-shaped battery.

The battery case may be made of a laminate sheet including a metal layer and a resin layer. A representative example of the battery cell may be a pouch-shaped battery including a battery case made of a laminate sheet including aluminum and resin.

The pouch-shaped battery may be configured to have a structure in which an electrode assembly of a cathode/separator/anode structure is mounted in a battery case in a state in which the electrode assembly is connected to electrode terminals protruding outward from the battery case. The metal layer may be made of an aluminum material.

As defined above, the electrode terminals deviate to one side from the vertical central axis of the battery body when viewed from above. The vertical central axis of the battery body when viewed from above means an axis passing just through the middle of the battery body in a vertical direction when viewed from above.

A plurality of axes passing just through the middle of the battery body in the vertical direction may be provided. The axes may have the same length. Alternatively, the axes may be classified into a minor axis having a small length and a major axis having a larger length than the minor axis.

In a preferred example, the electrode terminals are located at one end of the battery cell on a minor axis thereof.

In addition, the electrode terminals may deviate from a central axis of the battery body.

Specifically, in the structure in which the electrode terminals deviate from the central axis of the battery body, a deviation degree of the electrode terminals may be changed depending upon various conditions. In a preferred example, the electrode terminals may deviate from the central axis of the battery body to such an extent that the electrode terminals completely depart from the vertical central axis of the battery body when viewed from above.

In this specification, the expression "the electrode terminals completely depart from the vertical central axis of the battery body" may mean that the electrode terminals are formed in a state in which the electrode terminals are spaced apart from the vertical central axis of the battery body.

In addition, each of the electrode terminals may have a width equivalent to $1/20$ to $1/5$ the width of the battery body although the width of each of the electrode terminals is not particularly restricted. For example, in a case in which the width of each of the electrode terminals is about $1/10$ the width of the battery body and the electrode terminals deviate from the central axis of the battery body to such an extent that the electrode terminals completely depart from the vertical central axis of the battery body when viewed from above, it is possible to further increase the width of the depressed portion formed at one end of the battery body and to flexibly design the width of the depressed portion based on various shapes of the device to which the battery cell is applied.

Meanwhile, the depressed portion may be formed at the same side as one side of the battery body from which the electrode terminals protrude when viewed from above. In addition, the depressed portion may have a width equivalent to $1/5$ to $1/2$ the width of the battery body when viewed from above and a depth equivalent to $1/20$ to $1/2$ the length of the battery body when viewed from above although the width and depth of the depressed portion are not particularly restricted.

The depressed portion may be symmetric with respect to the vertical central axis of the battery body when viewed from above.

The width, depth, and symmetry of the depressed portion may be changed in design based on various conditions, such as the shape, inner space, and interference with other parts, of a device to which the battery cell is applied.

Consequently, it is possible to flexibly design and manufacture the battery cell according to the present invention based on the shape and internal space of the device. In addition, it is possible to flexibly design and manufacture the battery cell according to the present invention such that interference with other parts mounted in the device is avoided, whereby inner space utilization and integration of the device are improved.

In another preferred example, the present invention provides a battery cell configured to have a structure in which an electrode assembly that can be charged and discharged is mounted in a plate-shaped battery case, a cathode terminal and an anode terminal protrude from one end of the battery case, the electrode terminals deviate to one side from a vertical central axis of a battery body when viewed from above, a depressed portion is formed at one side of the battery body, and the electrode assembly has a thickness increased in one direction in vertical section.

Specifically, the electrode assembly may be configured to have a structure in which two or more electrodes or unit cells having different planar sizes are stacked.

Each of the unit cells may be a stacked type electrode assembly including a cathode, an anode, and a separator, the electrode assembly being configured to have a stacked structure in which the cathode and the anode are stacked in a state in which the separator is disposed between the cathode and the anode. In this case, the electrode assembly may be a combination type electrode assembly.

The width, depth, and stacked structure of the depressed portion may be changed in design based on various conditions, such as the shape, inner space, and interference with other parts, of a device to which the battery cell is applied. In addition, it is possible to flexibly design and manufacture the battery cell according to the present invention based on the shape and internal space of the device.

The battery cell having the above-described structure may be flexibly designed and manufactured based on the shape and internal space of the device. In addition, it is possible to flexibly design and manufacture the battery cell according to the present invention such that interference with other parts mounted in the device is avoided, whereby inner space utilization and integration of the device are improved.

In accordance with another aspect of the present invention, there is provided a battery module including the battery cell with the above-stated construction as a unit battery, wherein the battery cell includes two or more battery cells. The battery module includes battery cells which are flexibly designed and manufactured based on the shape and internal space of a device. Consequently, the battery module according to the present invention has high inner space utilization and integration.

In another preferred example, the present invention provides a battery module configured to have a structure in which two or more unit batteries having different planar sizes or capacities are arranged in a plane, each of the unit batteries has electrode terminals deviating to one side from a vertical central axis of a battery body when viewed from above, and a depressed portion is formed at one side of the battery body.

Specifically, each of the unit batteries may include an electrode assembly that can be charged and discharged, the electrode assembly being mounted in a plate-shaped battery case, and the electrode terminals may protrude from one end of the battery case.

In addition, the electrode terminals of the unit batteries may be electrically connected to each other via a cable, a bus bar, or a circuit board disposed at one side or opposite sides of each of the unit batteries.

The battery module with the above-stated construction includes battery cells which are flexibly designed and manufactured based on the shape and internal space of a device. Consequently, the battery module according to the present invention has high inner space utilization and integration.

In accordance with a further aspect of the present invention, there is provided a device including the battery module with the above-stated construction as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

The structure of the device and a method of manufacturing the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
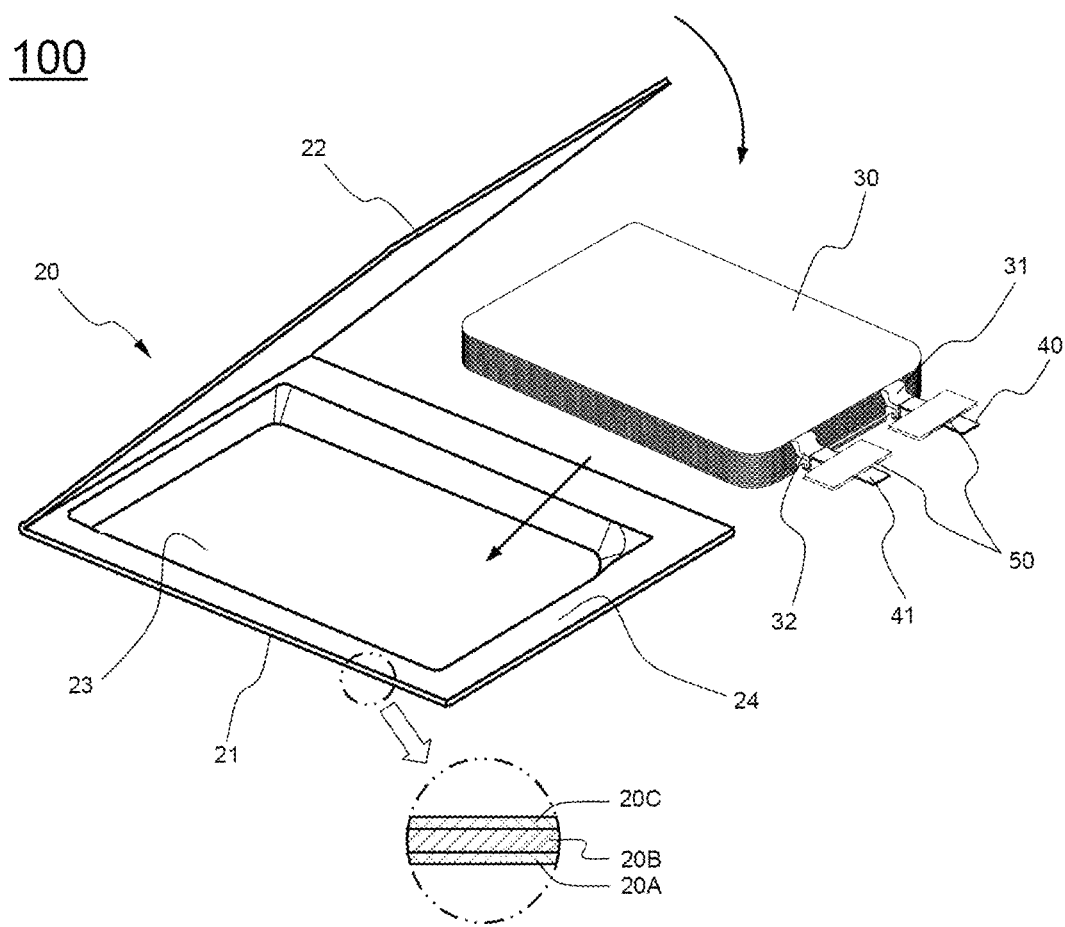
FIG. 1 is a perspective view showing a conventional battery cell.
Figure 2:
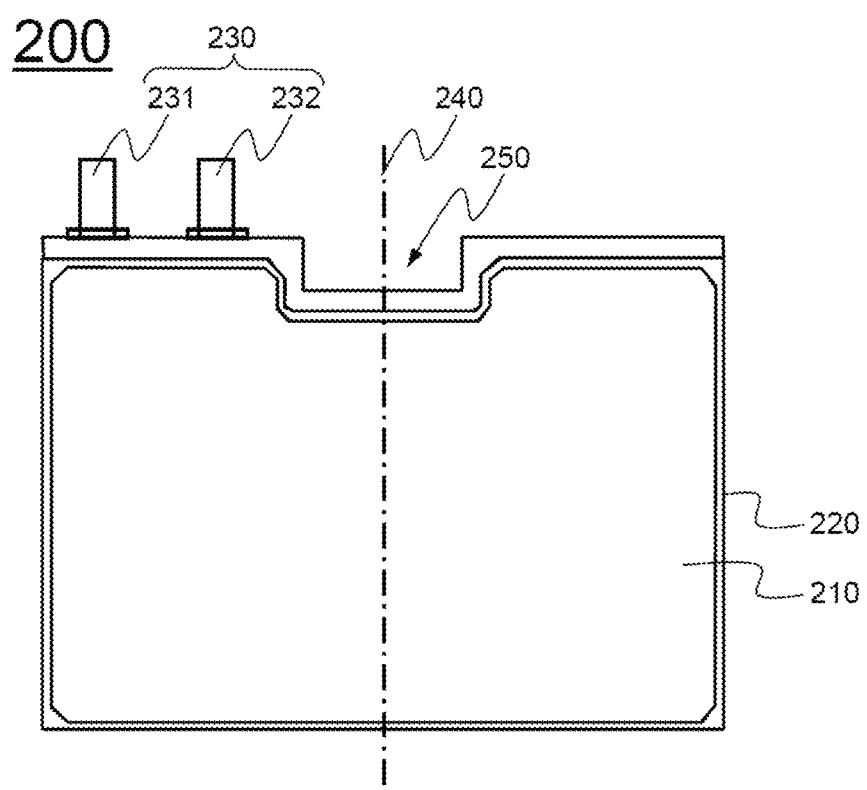
FIG. 2 is a plan view showing a battery cell according to an embodiment of the present invention.

FIG. 2 is a plan view typically showing a battery cell according to an embodiment of the present invention. Referring to FIG. 2, a battery cell 200 is configured to have a structure in which an electrode assembly 210 of a cathode/separator/anode structure is mounted in a pouch-shaped battery case 220. In general, the battery cell 200 is configured to have a quadrangular plate-shaped structure. That is, the battery cell 100 is configured to have a thin rectangular parallelepiped structure when viewed three-dimensionally.

A cathode terminal 231 and an anode terminal 232 protrude from one end of the battery case 220. The electrode terminals 231 and 232 deviate to one side from a vertical central axis 240 of the battery case 220 when viewed from above.

Figure 3:
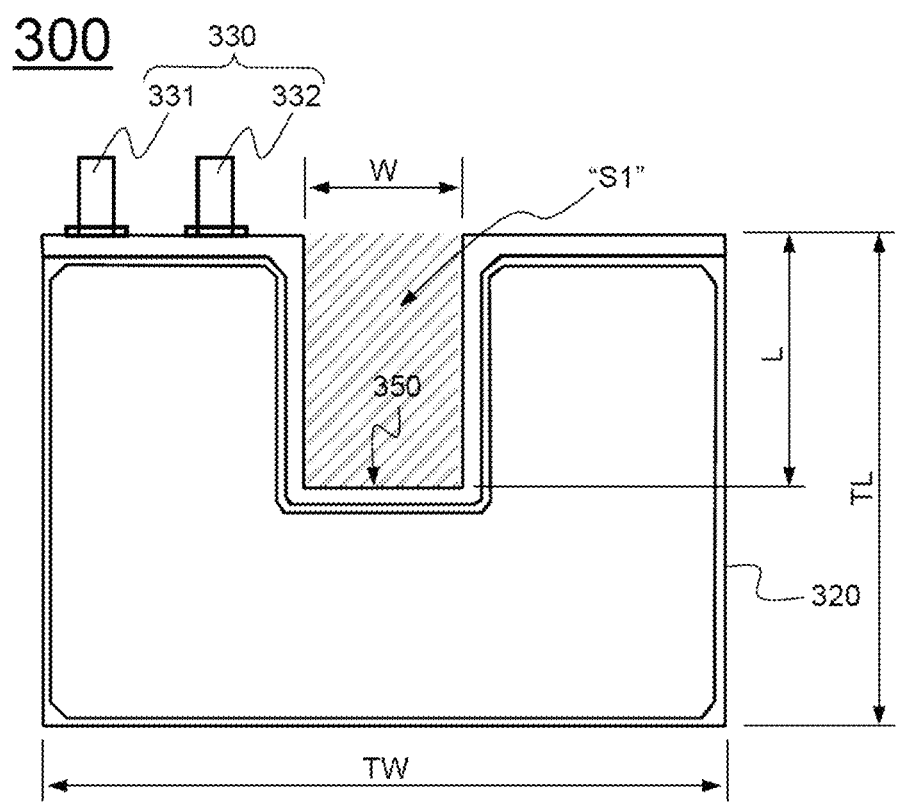
FIG. 3 is a plan view showing a battery cell according to another embodiment of the present invention.
Figure 4:
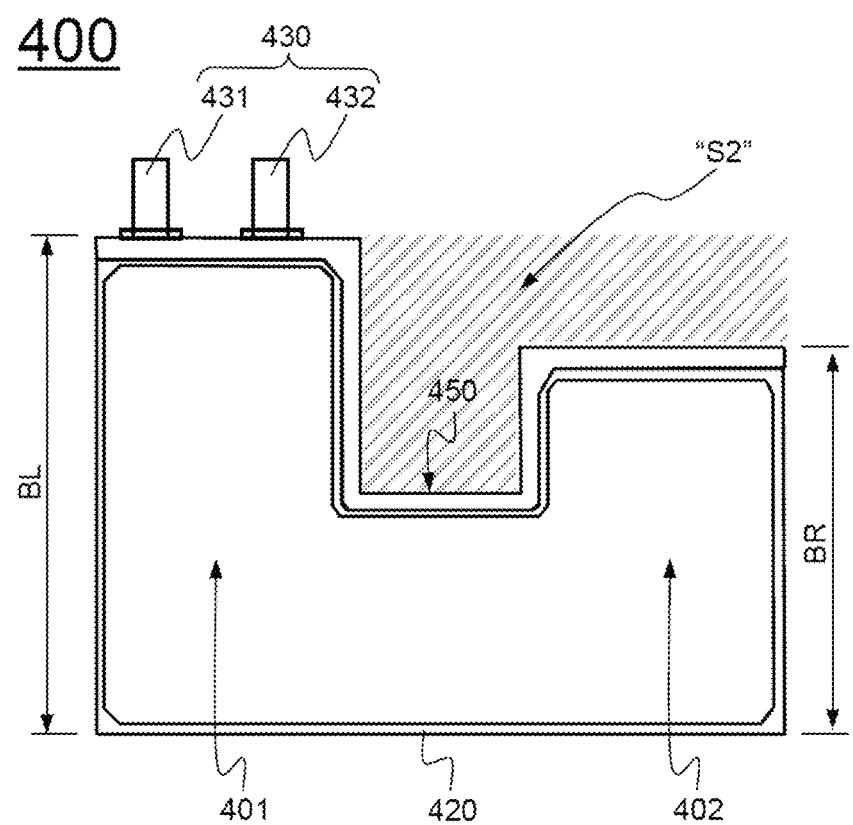
FIG. 4 is a plan view showing a battery cell according to another embodiment of the present invention.

In addition, a depressed portion 250 is formed at one side of the battery case 220. FIGS. 3 and 4 are vertical sectional views showing battery cells according to other embodiments of the present invention.

Referring to FIG. 3, an area S1 of a depressed portion 350 formed at one side of a battery cell 300 may be flexibly changed in design based on a width W and a length L of the depressed portion 350.

Referring to FIG. 4, a depressed portion 450 is formed at one side of a battery cell 400. As a result, a battery case 420 is partitioned into a left case part 401 and a right case part 402. An area S2 of the depressed portion 450 formed based on lengths BL and BR of the left case part 401 and the right case part 402 may be flexibly changed in design based on conditions of a device to which the battery cell is applied.

Figure 5:
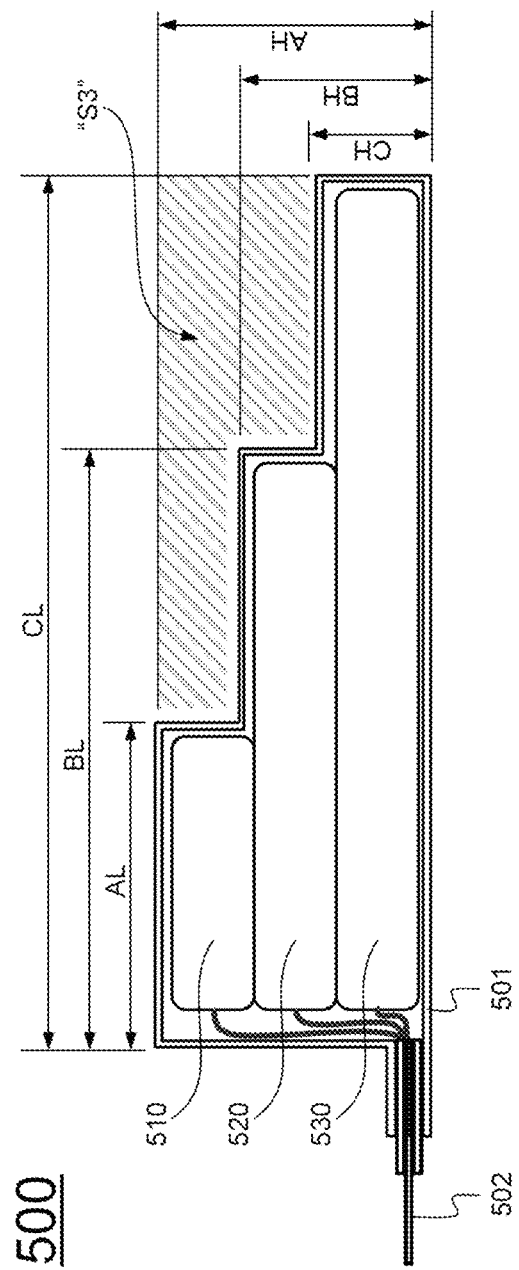
FIG. 5 is a side view, in vertical section, showing a battery cell according to a further embodiment of the present invention.

FIG. 5 is a side view, in vertical section, showing a battery cell according to a further embodiment of the present invention. Referring to FIG. 5, electrode assemblies 510, 520, and 530 having different lengths AL, BL, and CL and different capacities are mounted in a battery case 501 in a state in which the electrode assemblies 510, 520, and 530 are vertically stacked. The electrode assemblies 510, 520, and 530 which are vertically stacked are configured to have a structure in which the thickness of the vertically stacked electrode assemblies 510, 520, and 530 increases toward an electrode terminal 502 protruding outward from the battery case 501.

Meanwhile, the capacities of the electrode assemblies 510, 520, and 530 are proportional to the product of the lengths AL, BL, and CL, heights AH-BH, BH-CH, and CH, and widths (not shown) of the respective electrode assemblies 510, 520, and 530.

In such a unique structure of the battery cell 500, a spare space S3 is defined at the right upper end of the battery cell 500 due to the electrode assemblies 510, 520, and 530 having different sizes. The spare space is inversely proportional to the lengths, the heights, and the widths of the electrode assemblies 510, 520, and 530.

The spare space is provided to cope with conditions, such as an irregular inner space or interference with other parts, of a device to which the battery cell is applied. A thickness increase direction and a degree of stack thickness increase may also be flexibly changed in design based on applied conditions.

Figure 6:
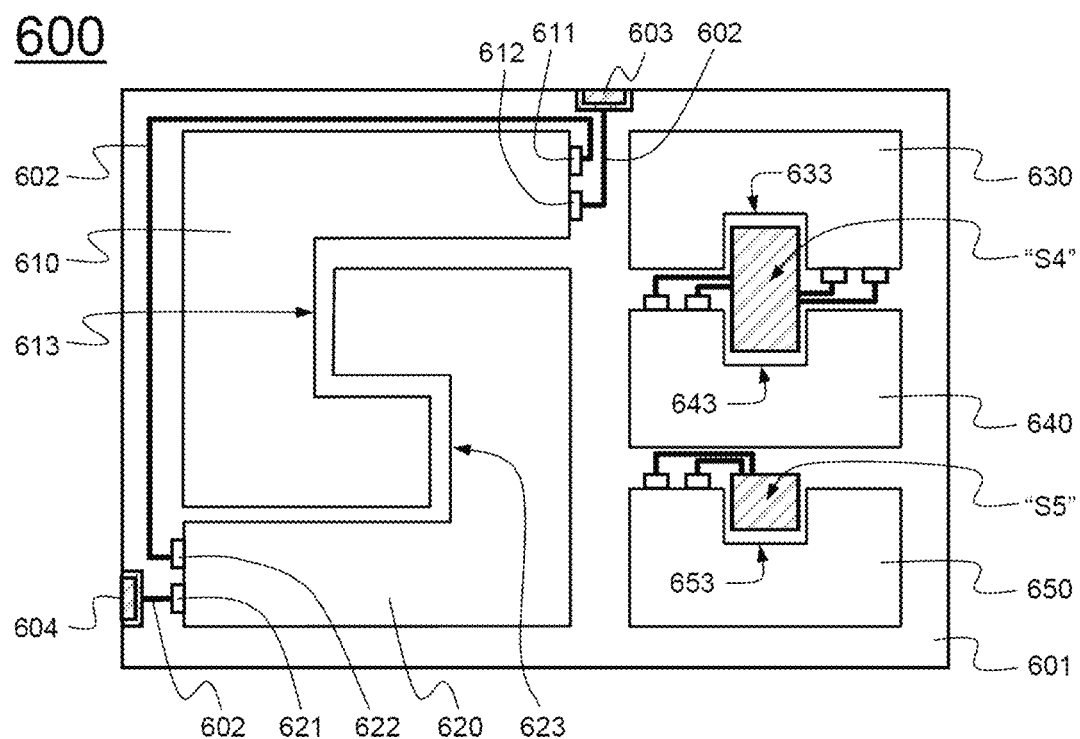
FIG. 6 is a plan view showing a battery pack including battery cells according to an embodiment of the present invention.

FIG. 6 is a plan view typically showing a battery pack including battery cells according to an embodiment of the present invention. Referring to FIG. 6, battery cells 610, 620, 630, and 640 are mounted on a circuit board 601. In addition, electrode terminals 611, 612, 621, and 622 of the respective battery cells 610, 620, 630, and 640 are electrically connected to one another or connected to external output terminals 603 and 604 via a circuit 602 formed on the circuit board 601.

Specifically, the two battery cells 610 and 620 are mounted at the left part of the circuit board 601 such that depressed portions 613 and 623 of the respective battery cells 610 and 620 are engaged with each other. The engagement-based structure is not achieved by conventional rectangular battery cells. The battery cells may be flexibly changed in design based on various conditions of the circuit board 601. Consequently, the battery module constituted by the battery cells according to the present invention has remarkably improved internal integration.

In addition, the battery cells 630 and 640 are arranged at the right part of the circuit board 601 such that depressed portions 633 and 643 of the respective battery cells 630 and 640 are opposite to each other. As a result, a spare space S4 is defined by the two depressed portions 633 and 643. Under the battery cell 640 is defined another spare space S5 by a depressed portion 653 formed at a battery cell 650 arranged in vertical parallel. The upper and lower spare spaces S4 and S5 may be used as installation spaces for electronic circuit parts (not shown) or as spaces to avoid spatial interference with other parts.

Consequently, the battery pack including the battery cells according to the present invention may be flexibly changed in design based on conditions of a device to which the battery pack is applied, thereby achieving remarkably improved internal integration.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured to have a structure in which an electrode assembly that can be charged and discharged is mounted in a plate-shaped battery case, a cathode terminal and an anode terminal protrude from one end of the battery case such that the cathode terminal and the anode terminal deviate to one side, and a depressed portion is formed at one side of a battery body. Consequently, it is possible to manufacture battery cells having various capacities and sizes.

In addition, a battery module including the above battery cells according to the present invention may be mounted in various spaces of a device to which the battery module is applied. Consequently, it is possible to maximally utilize an internal space of the device. Furthermore, the battery module according to the present invention may be mounted even in a space in which it is difficult to mount a conventional battery module as well as a narrow and small space. Consequently, it is possible to provide a battery cell having a novel structure based on which it is possible to design various types of battery modules and a battery module including the same.

The invention claimed is:

1. A battery module configured to have a structure in which two or more unit batteries having different planar sizes or capacities are arranged in a plane, wherein the unit batteries comprise two or more battery cells, wherein each battery cell is configured to have a structure in which an electrode assembly that can be charged and discharged is mounted in a plate-shaped battery case, a cathode terminal and an anode terminal protrude from one end of the battery case, the cathode and anode electrode terminals deviate to one side from a vertical central axis of a battery body that is parallel to a protruding direction of the cathode and anode electrode terminals, and a depressed portion is formed at one side of the battery body, and wherein each of the unit batteries has electrode terminals deviating to one side from a vertical central axis of a battery body that is parallel to protruding direction of the electrode terminals, and a depressed portion is formed at one side of the battery body.

2. The battery module according to claim 1, wherein each battery cell is a lithium ion battery or a lithium ion polymer battery.

3. The battery module according to claim 1, wherein each battery case is made of a laminate sheet comprising a metal layer and a resin layer.

4. The battery module according to claim 3, wherein each metal layer is made of an aluminum material.

5. The battery module according to claim 1, wherein the cathode and anode electrode terminals of each of the battery cells are located at one end of the corresponding battery cell on a minor axis thereof.

6. The battery module according to claim 1, wherein the cathode and anode electrode terminals of each of the battery cells deviate from a central axis of the battery body of the corresponding battery cell.

7. The battery module according to claim 1, wherein the cathode and anode electrode terminals of each of the battery cells has a width equivalent to $1/20$ to $1/5$ a width of the battery body of the corresponding battery cell.

8. The battery module according to claim 1, wherein the depressed portion of each battery cell is formed at the same side as one side of the battery body of the corresponding battery cell from which the cathode and anode electrode terminals of the corresponding battery cell protrude when viewed from above.

9. The battery module according to claim 1, wherein the depressed portion of each battery cell has a width equivalent to $1/5$ to $1/2$ a width of the battery body of the corresponding battery cell when viewed from above.

10. The battery module according to claim 1, wherein the depressed portion of each battery cell has a depth equivalent to $1/20$ to $1/2$ a length of the battery body of the corresponding battery cell when viewed from above.

11. The battery module according to claim 1, wherein the depressed portion of each battery cell is symmetric with respect to the vertical central axis of the battery body of the corresponding battery cell when viewed from above.

12. A battery module according to claim 1, wherein the two or more electrode assemblies have a thickness increased in one direction in vertical section.

13. The battery module according to claim 12, wherein the electrode assemblies are configured to have a structure in which two or more electrodes or unit cells having different planar sizes are stacked.

14. The battery module according to claim 1, wherein each of the unit batteries comprises a plate-shaped battery case, and the electrode terminals protrude from one end of the battery case.

15. The battery module according to claim 1, wherein the electrode terminals of the unit batteries are electrically connected to each other via a cable, a bus bar, or a circuit board disposed at one side or opposite sides of each of the unit batteries.

16. A device comprising a battery module according to claim 1 as a power source.

\* \* \* \* \*